(12) United States Patent
Kanai et al.

(10) Patent No.: US 10,348,833 B2
(45) Date of Patent: Jul. 9, 2019

(54) MULTIPLEX COMMUNICATION SYSTEM AND WORK MACHINE

(71) Applicant: FUJI CORPORATION, Chiryu-shi (JP)

(72) Inventors: Hidekazu Kanai, Chiryu (JP); Shigemoto Hirota, Nagoya (JP); Nobuo Nagasaka, Okazaki (JP)

(73) Assignee: FUJI CORPORATION, Chiryu-shi (JP)

( * ) Notice: Subject to any disclaimer, the term of this patent is extended or adjusted under 35 U.S.C. 154(b) by 0 days.

(21) Appl. No.: 15/555,650

(22) PCT Filed: Mar. 6, 2015

(86) PCT No.: PCT/JP2015/056666
§ 371 (c)(1),
(2) Date: Sep. 5, 2017

(87) PCT Pub. No.: WO2016/142999
PCT Pub. Date: Sep. 15, 2016

(65) Prior Publication Data
US 2018/0048714 A1   Feb. 15, 2018

(51) Int. Cl.
*H04L 29/08*   (2006.01)
*G05B 19/418*   (2006.01)
(Continued)

(52) U.S. Cl.
CPC ........ *H04L 67/12* (2013.01); *G05B 19/41855* (2013.01); *H04L 12/403* (2013.01);
(Continued)

(58) Field of Classification Search
None
See application file for complete search history.

(56) References Cited

U.S. PATENT DOCUMENTS

2013/0177026 A1   7/2013   Soni et al.
2016/0261373 A1*  9/2016   Nagasaka ............... H04L 1/007

FOREIGN PATENT DOCUMENTS

JP   3186490 B2   5/2001

OTHER PUBLICATIONS

U.S. Appl. No. 15/550,212, filed Aug. 10, 2017, Matsumoto, et al.
(Continued)

*Primary Examiner* — Hicham B Foud
(74) *Attorney, Agent, or Firm* — Oblon, McClelland, Maier & Neustadt, L.L.P.

(57) ABSTRACT

Provided are a multiplex communication system and a work machine that can appropriately perform transmission and reception of data between a processing circuit used in an industrial network and a multiplex processing section that multiplexes and transmits control data transmitted in the industrial network. A slave processes control data in the industrial network. The control data processed by the slave is transmitted and received by the multiplex communication by a multiplex processing section. A DUMMY-PHY, which is connected between the multiplex processing section and the slave, generates, in a pseudo manner, a signal compliant with an MII communication standard using a pseudo signal generation section, and transmits the generated signal to the slave, thereby performing establishment of communication. The DUMMY-PHY performs data transmission between the multiplex processing section and the slave after establishing communication with the slave.

6 Claims, 4 Drawing Sheets

(51) Int. Cl.
*H04L 12/403* (2006.01)
*H04L 29/06* (2006.01)
*H04L 12/40* (2006.01)

(52) U.S. Cl.
CPC .............. *H04L 69/08* (2013.01); *H04L 69/18* (2013.01); *G05B 2219/31102* (2013.01); *H04L 12/40006* (2013.01)

(56) References Cited

OTHER PUBLICATIONS

U.S. Appl. No. 15/554,386, filed Aug. 29, 2017, Matsumoto, et al.
Extended European Search Report dated Jan. 24, 2018 in European Patent Application No. 15884497.7, 8 pages.
International Search Report dated May 26, 2015 in PCT/JP2015/05666, filed on Mar. 6, 2015.

* cited by examiner

MULTIPLEX COMMUNICATION SYSTEM AND WORK MACHINE

TECHNICAL FIELD

The present application relates to a multiplex communication system that performs connecting in an industrial network and a work machine that performs transmitting data related to mounting work using the multiplex communication system.

BACKGROUND ART

A work machine (for example, an electronic component mounting device) used in Factory Automation (FA) field includes a servomotor or the like as a driving source for operating a movable section, such as amounting head. In addition, a serial encoder or the like is used to detect a rotational position necessary for controlling the servomotor. As a communication system for transmitting output of the serial encoder used in such work machine or the like, there is a communication system in which output of multiple serial encoders are collectively transmitted through one data line to save wiring (for example, PTL 1).

Network communication technology represented by the Internet has also been utilized in the FA field and, for example, there is what is called an industrial Ethernet using Ethernet (registered trademark) technology as an industrial network for the FA field. In such industrial network, it is possible to save wiring by multiplexing analog or digital information into one transmission line.

CITATION LIST

Patent Literature

PTL 1: Japanese Patent No. 3186490

SUMMARY

Technical Problem

However, in a case where multiple types of industrial network standards are employed in the work machine described above, a LAN cable or the like corresponding to each standard is necessary and the number of wires increases. There is a case where this type of work machine includes an inspection camera or the like. In a case where a relatively large amount of data, such as image data captured by a camera, is transmitted, a cable for transmitting the image data is necessary in addition to a cable for the industrial network. In response, it is considerable to multiplex various types of data and collectively transmit the data through one transmission line.

In an industrial network, as an embodiment of control, for example, a slave device for controlling various sensors, relays, switches, or the like used in a factory and a master device for integratedly controlling the slave device are set and the entire control is performed. In the master device or the slave device, an IP core or an ASIC compliant with each industrial network standard is prepared. However, when an interface standard is limited, there is a problem that transmission and reception of data become complicated in a case where the multiplex communication described above is performed.

The present disclosure has been made in view of the above-mentioned problems and an object of the present disclosure is to provide a multiplex communication system and a work machine that can appropriately perform transmission and reception of data between a processing circuit used in an industrial network and a multiplex processing section that multiplexes and transmits control data transmitted in the industrial network.

Solution to Problem

A multiplex communication system according to a technique disclosed in the present disclosure made in view of the above-mentioned problems includes: a processing circuit for processing control data in an industrial network; a multiplex processing section that multiplexes the control data input from the processing circuit and transmits the generated multiplexed data to other processing circuits; and a pseudo signal transmission section, which is connected between the processing circuit and the multiplex processing section, that transmits the control data between the multiplex processing section and the processing circuit by generating, in a pseudo manner, a signal compliant with a communication standard in the industrial network, transmitting the generated signal to the processing circuit, and establishing communication with the processing circuit. Here, "industrial network" is a network that transmits control data of a relay, a switch, or the like using a communication standard, such as EtherCAT (registered trademark), NECHATROLINK (registered trademark)-III, or Profinet (registered trademark).

The present disclosure is not limited to the multiplex communication system, but can also be employed as a work machine for transmitting data related to mounting work using the multiplex communication system.

Advantageous Effects

According to the technique disclosed in the present disclosure, it is possible to provide a multiplex communication system and a work machine that can appropriately perform transmission and reception of data between a processing circuit used in an industrial network and a multiplex processing section that multiplexes and transmits control data transmitted in the industrial network.

DESCRIPTION OF EMBODIMENTS

Figure 1:
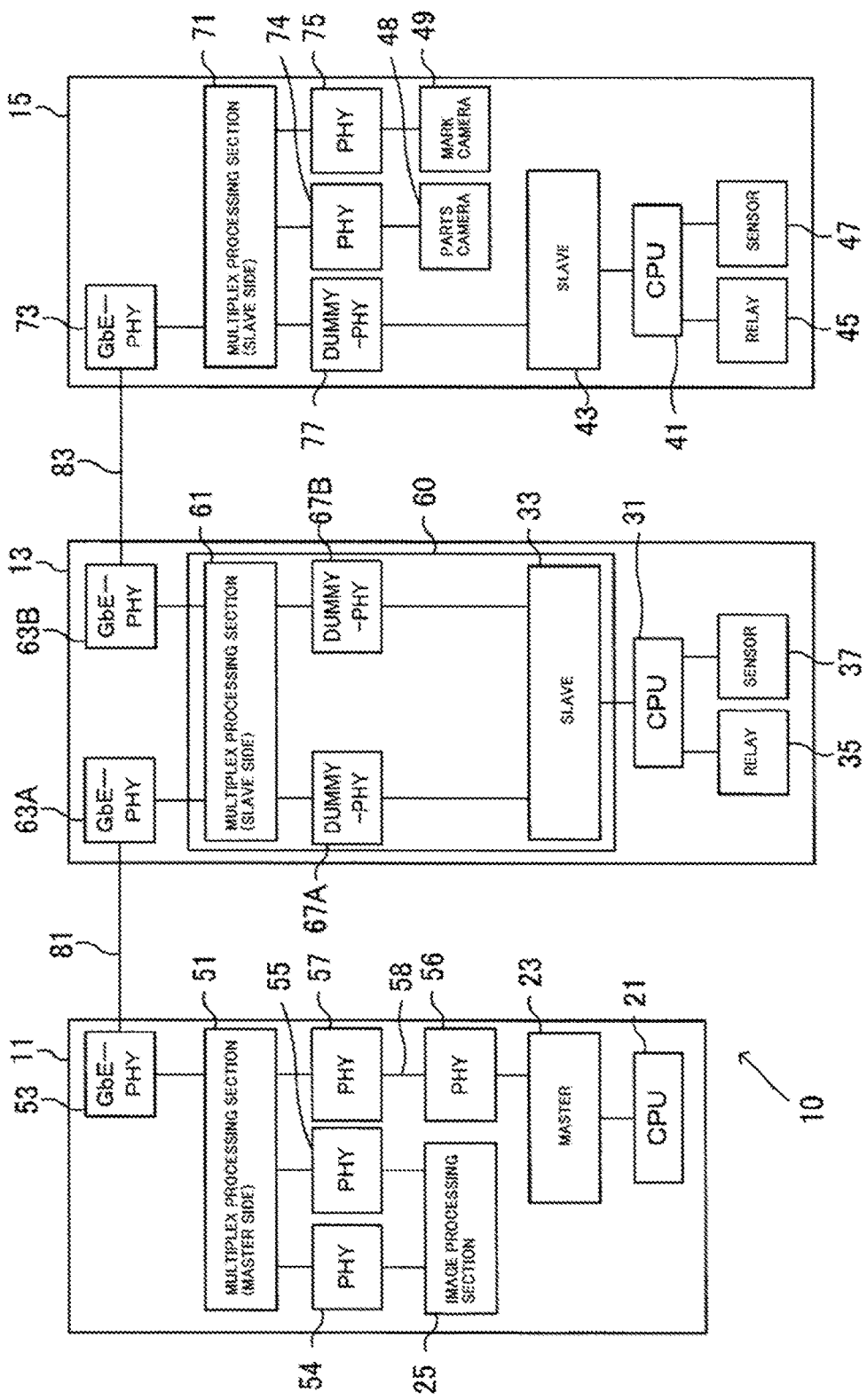
FIG. 1 is a block diagram of an electronic component mounting device in which a multiplex communication system is employed according to an embodiment.

Hereinafter, an embodiment of the present disclosure will be described with reference to drawings. FIG. 1 schematically shows a system configuration of an electronic component mounting device (hereinafter, it may be abbreviated as "mounting device") 10 as an example of a device employing a multiplex communication system according to the present disclosure. As shown in FIG. 1, the mounting device 10 includes a control section 11, a slider section 13, and a head section 15. The mounting device 10 according to this embodiment is a device that performs mounting work of an electronic component, supplied from a supply device (for example, tape feeder), on a circuit board (not shown) based on control of the control section 11.

The control section 11 is configured mainly of a CPU 21 and includes a master 23, an image processing section 25, and the like. The slider section 13 is provided with a slave 33 corresponding to the master 23 of the control section 11. The head section 15 is provided with a slave 43 corresponding to the master 23. The master 23 integrally controls transmission of control data with the slaves 33, 43 connected to an industrial network (for example, EtherCAT (registered trademark)). The master 23 is an IP core which is used for configuring a logic circuit, such as a programmable logic device (PLD), a field programmable gate array (FPGA), or a complex programmable logic device (CPLD). The master 23 is not limited to the logic circuit and may be, for example, an application-specific integrated circuit (ASIC) specialized for a communication control or a combination of the ASICs and the logic circuits.

The CPU 21 inputs control data or the like collected by the master 23 and determines the next control content. The CPU 21 outputs control data according to the determined control content to the master 23. The master 23 transmits the control data input from the CPU 21 to each of the slaves 33, 43 through the industrial network.

The slider section 13 is a driving device that moves the head section 15 in an X-axis direction and a Y-axis direction on an upper part of the circuit board carried into the mounting device 10. The slider section 13 includes a slide mechanism (not shown) for moving the head section 15 in the X-axis direction and the Y-axis direction. The slider section 13 includes, for example, a linear motor as a driving source for operating the slide mechanism.

The slider section 13 includes the CPU 31 and the like in addition to the slave 33 described above. The CPU 31 performs processing of signals which are input and output in various elements (for example, a relay 35 and a sensor 37) attached to the slider section 13. The sensor 37 is, for example, a board height sensor that measures a height of an upper face of the circuit board based on a reference height position set in the mounting device 10. The slave 33 outputs the control data transmitted from the master 23 of the control section 11 to the CPU 31. The CPU 31 performs a drive control of the relay 35 or the like based on the input control data. In addition, the CPU 31 processes an output signal of the sensor 37 or the like and outputs the processed signal to the slave 33 as control data. The slave 33 transmits the control data input from the CPU 31 toward the master 23.

The head section 15 includes a CPU 41, a parts camera 48, a mark camera 49, and the like in addition to the slave 43 described above. The CPU 41 performs processing of signals which are input and output in various elements (for example, a relay 45 and a sensor 47) disposed on the head section 15. The slave 43 outputs the control data transmitted from the master 23 of the control section 11 to the CPU 41. In addition, the slave 43 transmits an output signal of the sensor 47 or the like processed by the CPU 41 to the master 23 as control data.

The parts camera 48 is a camera that images an electronic component, which suctioned and held by a suction nozzle (not shown) mounted on the head section 15. The image processing section 25 of the control section 11 processes image data captured by the parts camera 48 and acquires, for example, an error of a holding position of the electronic component in the suction nozzle. The mark camera 49 is a camera for imaging a mark on the circuit board or the electronic component after mounting. The head section 15 is moved by the slider section 13. Accordingly, the mark camera 49 can image a surface at an arbitrary position on the circuit board. The image processing section 25 processes image data captured by the mark camera 49 and acquires information related to the circuit board, an error of a mounting position, or the like. The head section 15 includes an electromagnetic motor (for example, a servomotor) as a driving source for lifting, lowering, rotation, or the like of the suction nozzle.

Next, the multiplex communication system for transmitting the control data of the industrial network described above and the image data of the parts camera 48 or the like will be described. In the mounting device 10, data transmission between the control section 11, the slider section 13, and the head section 15 is performed by the multiplex communication.

As shown in FIG. 1, the control section 11 includes a multiplex processing section 51 and five PHYs 53 to 57 in addition to the CPU 21 and the like described above. The PHY 53 is connected to a PRY 63A included in the slider section 13 through a LAN cable 81 compliant with, for example, a Gigabit Ethernet (registered trademark) communication standard. Similarly, a PHY 63B included in the slider section 13 is connected to a PRY 73 included in the head section 15 through a LAN cable 83.

The multiplex processing section 51 of the control section 11 multiplexes control data of the industrial network or image data, for example, using Time Division Multiplexing (TDM), and transmits and receives the multiplexed data. The multiplex processing section 51 is realized by a logic circuit, such as a field programmable gate array (FPGA). The multiplex processing section 51 transmits and receives the multiplexed data with a multiplex processing section 61 of the slider section 13 or a multiplex processing section 71 of the head section 15 through the LAN cables 81, 83. The parts camera 48 of the head section 15 outputs a captured image data, using an image transmission standard such as GigE-vision (registered trademark), to the multiplex processing section 71 through a PRY 74. The parts camera 48, for example, performs imaging in response to receiving a trigger signal, which is transmitted from the image processing section 25 of the control section 11 through multiplex communication, indicating a start of the imaging and outputs the captured image data to the multiplex processing section 71. Similarly, the mark camera 49 outputs a captured image data to the multiplex processing section 71 through a PHY 75.

The multiplex processing section 71 is connected to the slave 43 through a DUMMY-PHY 77 described later and the control data related to the industrial network is input from the slave 43 into the multiplex processing section. The multiplex processing section 71 multiplexes various data, such as image data or control data, and transmits the multiplexed data to the multiplex processing section 51 (control section 11) through the LAN cables 81, 83.

The multiplex processing section 51 is connected to the image processing section 25 through cables connected to PHYs 54, 55. The PHY 54 corresponds to the parts camera 48 of the head section 15. The PHY 55 corresponds to the mark camera 49. The multiplex processing section 51, for example, demultiplexes the multiplexed data received from the multiplex processing section 71 and separates the image data of the parts camera 48. The multiplex processing section 51 outputs the separated image data, in a data type compliant with GigE-vision (registered trademark) standard, to the image processing section 25 through the PHY 54. The image processing section 25 processes the input image data of the parts camera 48 and acquires, for example, an error of the holding position of the electronic component or the like. Similarly, the multiplex processing section 51 outputs the image data of the mark camera 49 separated from the multiplexed data to the image processing section 25 through the PRY 55.

The multiplex processing section 51 is connected to the master 23 through two PHYs 56, 57. The PRY 56 is connected to the master 23. The PRY 57 is connected to the multiplex processing section 51. The PHYs 56, 57, for example, are connected through a LAN cable 58. The multiplex processing section 61 of the slider section 13 is connected to the slave 33 through each of DUMMY-PHYs 67A, 67B. The master 23 of the control section 11 configures the industrial network that performs transmission and reception of control data or the like with elements, such as the relay 35 connected to the slaves 33, 43, thereby achieving an integration (reduction) of wires or the like.

More specifically, the industrial network described above is a network compliant with, for example, EtherCAT (registered trademark) standard. In the industrial network, an EtherCAT frame transmitted from the master 23 is transmitted so as to be circulated through each of the slaves 33, 43, and transmitted and received at high speed. For example, the slave 33 performs a reading or writing process with respect to the EtherCAT frame received from the master 23 and transmits the processed data to the slave 43 of the head section 15. The slave 33 copies data from a data position of reading for the slave 33 set in advance in the EtherCAT frame and performs processing such as driving of the relay 35 according to the contents of the copied data. In addition, the slave 33 writes, for example, information indicating completion of the driving of the relay 35 or detection information of the sensor 37 to a data position of writing for the slave 33 set in advance in the EtherCAT frame and transmits the information to the head section 15. In this manner, the slaves 33, 43 switch and transmit frames at high speed while performing input and output processes with respect to the EtherCAT frame.

Figure 4:
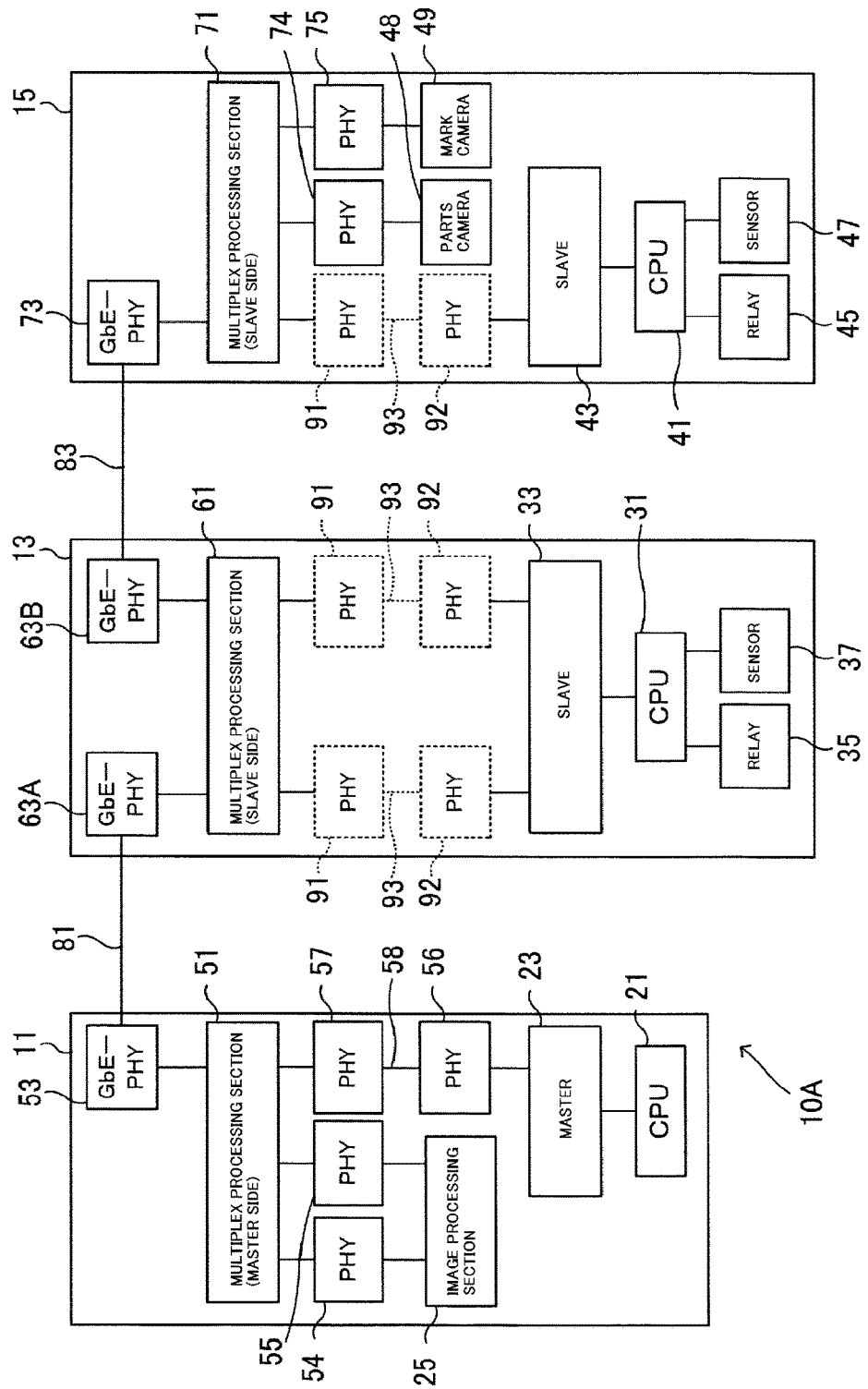
FIG. 4 is a block diagram of an electronic component mounting device according to a comparative example.

Here, a configuration of a comparative example will be described. FIG. 4 shows a configuration of a mounting device 10A as the comparative example. In the mounting device 10A, as indicated by a dashed line in FIG. 4, a PHY 91 is connected to the multiplex processing section 61. A PHY 92 is connected to the slave 33. The PHYs 91, 92 are connected through an Ethernet (registered trademark) cable 93.

Accordingly, the multiplex processing section 61 and the slave 33 are connected through the two PHYs 91, 92 and the Ethernet (registered trademark) cable 93. Similarly, the multiplex processing section 71 is connected to the slave 43 through two PHYs 91, 92 and Ethernet (registered trademark) cable 93. The PHYs 91, 92 are, for example, ICs that function as an interface between a logical layer and a physical layer. The PHY 91 converts a digital signal input from the multiplex processing section 61 or the like into an analog signal temporarily and transmits the analog signal to the PHY 92 through the cable 93. The PRY 92 converts the analog signal received from the PHY 91 into a digital signal again and then transmits the digital signal to the slave 33 or the like. Similarly, the PHY 92 converts a digital signal input from the slave 33 or the like into an analog signal temporarily and transmits the analog signal to the PHY 91. The PHY 91 converts the received analog signal into a digital signal again and then transmits to the multiplex processing section 61 or the like.

For example, in an IP core (for example, the slave 33) for a slave used in EtherCAT (registered trademark), it is assumed that the IP core is connected to an external device and, as an external interface, such PHY 92 is often equipped as a standard. In such IP core, it is set not to start communication with the external device unless a communication link with the PHYs 91, 92 has been established. Accordingly, in a case of connecting to an external device, such as the multiplex processing section 61 of this embodiment, utilizing the IP core used in the industrial network, there is a need to connect through the two PHYs 91, 92 and the cable 93.

On the other hand, in the mounting device 10 of this embodiment shown in FIG. 1, the DUMMY-PHYs 67A, 67B, and 77 generate, in a pseudo manner, signals compliant with, for example, a media independent interface (MII) communication standard, and transmit the generated signals to the slaves 33, 43, thereby performing establishment of communication. The DUMMY-PHYs 67A, 67B, and 77 have a similar configuration. Accordingly, in the following description, the DUMMY-PRY 67A will mainly be described as a representative.

The DUMMY-PHYs 67A, 67B, and 77 are realized by a logic circuit such as a field programmable gate array (FPGA). In the slider section 13 of this embodiment, the multiplex processing section 61, the slave 33, and the DUMMY-PHYs 67A, 67B are, for example, incorporated within a same logic circuit of an FPGA 60. In other words, preferably, the multiplex processing section 61, the slave 33, and the DUMMY-PHYs 67A, 67B are collectively mounted on the same board of the FPGA 60.

Figure 2:
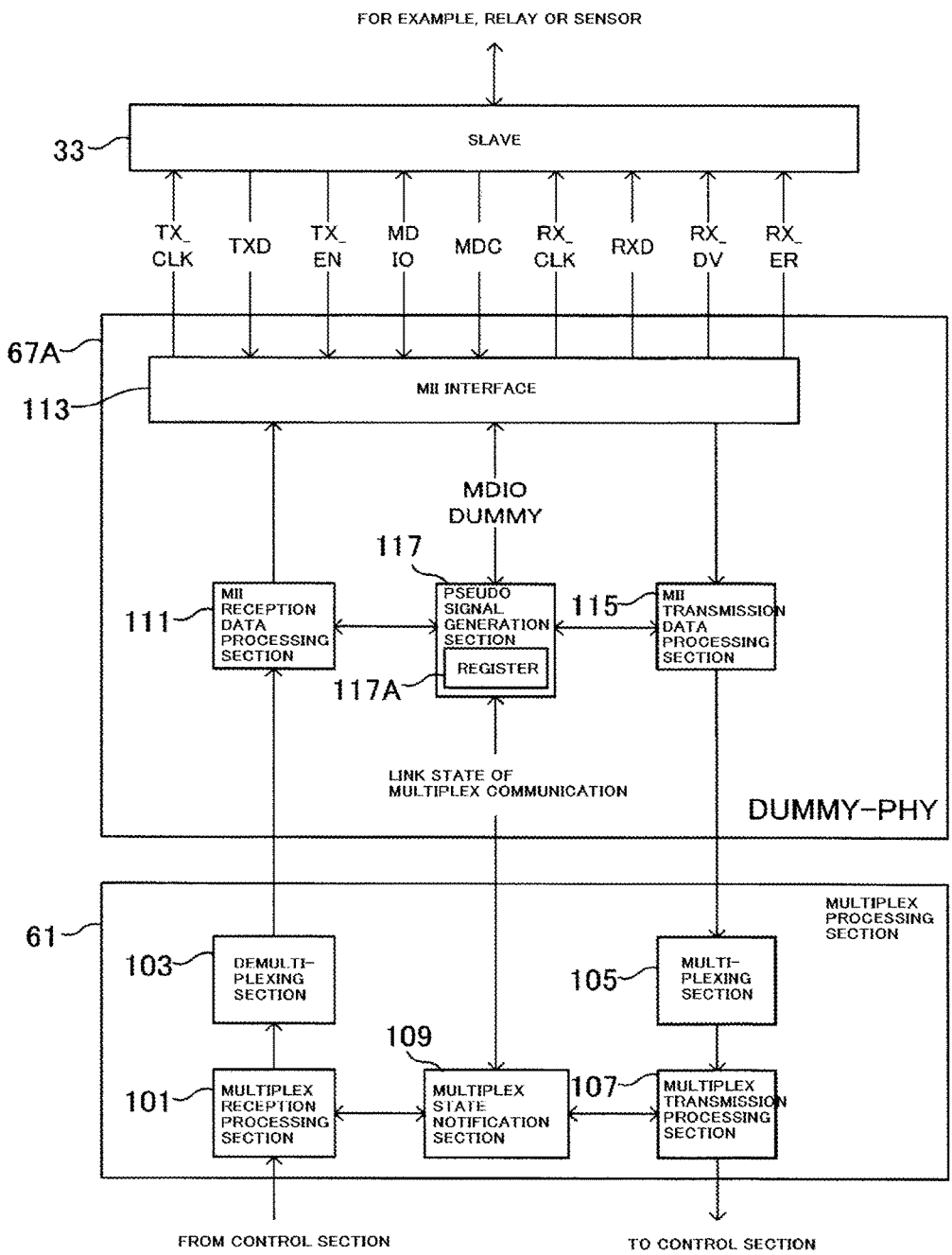
FIG. 2 is a block diagram showing a schematic configuration of a multiplex processing section and a DUMMY-PHY.

FIG. 2 shows a schematic configuration of the DUMMY-PRY 67A and the multiplex processing section 61. In the multiplex processing section 61, for example, a multiplex reception processing section 101 receives multiplexed data from the multiplex processing section 51 and a demultiplexing section 103 performs a separating process of the multiplexed data. The multiplex processing section 61 outputs data related to the slave 33, among the data separated by the demultiplexing section 103, to an MII reception data processing section 111 of the DUMMY-PHY 67A.

An MII interface 113 included in the DUMMY-PRY 67A is an interface connected to the slave 33 and performs communication compliant with the MII standard. The MII reception data processing section 111 transmits the data input from the demultiplexing section 103 to the slave 33 through the MII interface 113.

An MII transmission data processing section 115 of the DUMMY-PHY 67A transmits the data transmitted from the slave 33 through the MII interface 113 to a multiplexing section 105 of the multiplex processing section 61. The multiplexing section 105 multiplexes control data of the relay 35 or the like connected to the slave 33 and data from other devices, and outputs the multiplexed data to a multiplex transmission processing section 107. Here, "other devices" corresponds to, for example, the sensor 37 included in the slider section 13 or the parts camera 48 of the head section 15. The multiplex transmission processing section 107 transmits the multiplexed data input from the multiplexing section 105 to the multiplex processing section 51 of the control section 11.

The MII interface 113 transmits and receives data to and from the slave 33 as a TXD signal (transmission data) or an RXD signal (reception data) shown in FIG. 2. In addition, the MII interface 113 transmits and receives various control signals to and from the slave 33 in addition to the TXD signal or the RXD signal. For example, the MII interface 113 transmits a transmission clock signal such as a TX_CLK signal, a media dependent input/output (MDIO) signal for management control described later, an MDC signal that is a clock signal of the MDIO signal, and the like.

As described above, in an IP core for a slave used in the industrial network, communication with the external device (for example, multiplex processing section 61) is not started unless communication link between the IP core and the PHYs 91, 92 (refer to FIG. 4) has been established. Specifically, in a case shown in FIG. 4, the PHY 92 is provided with a register indicating whether communication with the other PRY 91 has been established. The slave 33 transmits an MDIO signal to the PHY 92 and acquires information set in the register of the PRY 92. In a case where the acquired register value is a value indicating communication establishment, the slave 33 starts communication with the multiplex processing section 61 through the PHYs 91, 92. On the other hand, the slave 33 does not start the communication with multiplex processing section 61 until a register value indicating the communication establishment is acquired. In a case where the multiplex communication is started, a pseudo signal generation section 117 of the DUMMY-PHY 67A shown in FIG. 2 transmits an MDIO signal to the slave 33 through the MII interface 113, thereby establishing communication with the slave 33.

Figure 3:
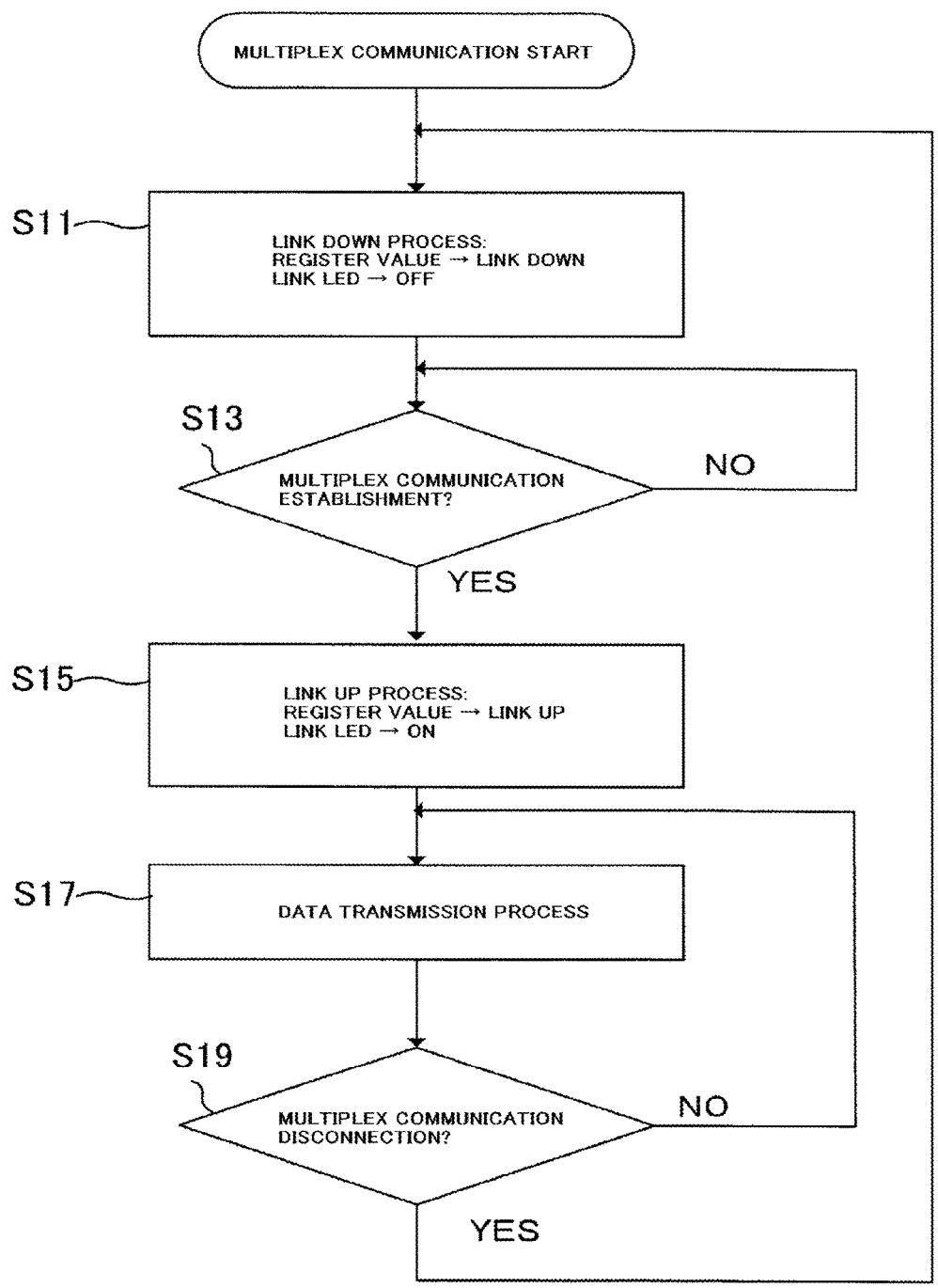
FIG. 3 is a flowchart illustrating the operation of a DUMMY-PHY.

FIG. 3 shows a processing procedure of the DUMMY-PHY 67A.

First, when a power supply of the mounting device 10 is turned on, a configuration is performed to configure the logic circuit, such as the multiplex processing section 61 of the FPGA 60. When the circuit configuration completed, in step (hereinafter, simply denoted as "S") 11 of FIG. 3, the pseudo signal generation section 117 sets a register value to a register 117A (refer to FIG. 2) included in the pseudo signal generation section 117. The pseudo signal generation section 117 sets a value indicating link down to the register 117A in a state where multiplex communication by the multiplex processing section 61 has not been established. In such state, the DUMMY-PHY 67A, for example, responds with the register value indicating link down even though there is an inquiry by the MDIO signal from the slave 33. In addition, the pseudo signal generation section 117 performs lighting control of a link LED indicating a state of communication. For example, the pseudo signal generation section 117 performs control of turning off the link LED on the circuit board in a state where communication has not been established.

The MII reception data processing section 111 and the MII transmission data processing section 115 can control the start or stop of data transmission based on control of the pseudo signal generation section 117. The pseudo signal generation section 117 stops the transmission operation of the MII reception data processing section 111 and the MII transmission data processing section 115 in a state where the multiplex communication has not been established.

In such state where the multiplex communication has not been established, in a case where various inquiries are made from the slave 33, the pseudo signal generation section 117 may perform a process of responding to the inquiries. For example, in a case where a setting on transmission speed of data is performed from the slave 33, the pseudo signal generation section 117 may perform a so-called auto negotiation such as setting of an appropriate communication speed in response to the setting on the transmission speed of data.

A multiplex state notification section 109 of the multiplex processing section 61 shown in FIG. 2 monitors a state of the multiplex communication. For example, the multiplex state notification section 109 monitors a state of the multiplex reception processing section 101 and the multiplex transmission processing section 107, and determines whether the multiplex communication has been established. When it is detected that the multiplex communication has been established, the multiplex state notification section 109 transmits the information to the pseudo signal generation section 117.

For example, in a case where the multiplex communication with the control section 11 has been established through the LAN cable 81 (refer to FIG. 1), it is preferable that the multiplex state notification section 109 is set to transmit the information to the pseudo signal generation section 117. More specifically, the multiplex processing section 61, for example, includes each of a processing section (for example, demultiplexing section 103, multiplex state notification section 109 shown in FIG. 2) performing the multiplex communication through the LAN cable 81 and a processing section (not shown) performing the multiplex communication through the LAN cable 83. Accordingly, the slave 33 performs communication with the control section 11 through the DUMMY-PHY 67A, the processing section corresponding to the LAN cable 81 of the multiplex processing section 61, and the PHY 63A. In addition, the slave 33 performs communication with the head section 15 through the DUMMY-PHY 67B, the processing section corresponding to the LAN cable 83 of the multiplex processing section 61, and the PHY 63B. In other words, the multiplex processing section 61 processes data transmitted through two communication lines within the multiplex processing section. For this purpose, the multiplex state notification section 109 corresponding to the DUMMY-PHY 67A notifies a communication state of the LAN cable 81 to the pseudo signal generation section 117 of the DUMMY-PHY 67A. In addition, a multiplex state notification section (not shown) corresponding to the DUMMY-PHY 67B notifies a communication state of the LAN cable 83 to a pseudo signal generation section (not shown) of the DUMMY-PHY 67B. Consequently, even in a state where only the LAN cable 83 is disconnected, if the LAN cable 81 is connected, communication between the master 23 and the slave 33 is possible through LAN cable 81.

Next, in 813 shown in FIG. 3, the pseudo signal generation section 117 maintains a state of link down until a signal indicating establishment of the multiplex communication is input from the multiplex state notification section 109 (S13: NO).

When the signal indicating the establishment of the multiplex communication input from the multiplex state notification section 109 (S13: YES), the pseudo signal generation section 117 sets a value indicating link up to the register 117A (S15). Accordingly, when there is an inquiry by the MDIO signal from the slave 33, the pseudo signal generation section 117 responds with the register value indicating link up. In addition, the pseudo signal generation section 117 turns on the link LED on the circuit board to notify the state of link up (S15).

Next, in S17, the pseudo signal generation section 117 causes the MII reception data processing section 111 and the MII transmission data processing section 115 to start a transmission process. Accordingly, the MII transmission data processing section 115 starts the process of transmitting data received from the slave 33 to the multiplexing section 105. The MII reception data processing section 111 starts the process of transmitting data received from the demultiplexing section 103 to the slave 33. Consequently, it is possible that the DUMMY-PHY 67 appropriately performs transmission and reception of data between the multiplex processing section 61 and the slave 33.

The pseudo signal generation section 117 continues the transmission process by the MII reception data processing section 111 and the MII transmission data processing section 115 until the multiplex communication is disconnected (S19: NO). When information on which the multiplex communication is disconnected is input from the multiplex state notification section 109, the pseudo signal generation section 117 performs an establishment process of a link from S11 again. Consequently, it is possible that the link between the multiplex processing section 61 and the slave 33 is automatically established again according to the timing at which the multiplex communication is recovered.

The electronic component mounting device 10 is an example of a work machine. The head section 15 is an example of a movable section. The electronic component is an example of a workpiece. The master 23 and the slaves 33, 43 are an example of a processing circuit. The pseudo signal generation section 117 is an example of a pseudo signal transmission section.

According to the embodiment described in detail above, the following effects are obtained.

<Effect 1> The master 23 and the slaves 33, 43 process control data in an industrial network (for example, EtherCAT (registered trademark)). The control data processed by the master 23 or the like is transmitted and received by multiplex communication by the multiplex processing sections 51, 61 and 71. The DUMMY-PRY 67A of the slider section 13, which is connected between the multiplex processing section 61 and the slave 33, generates, in a pseudo manner, a signal compliant with the MII communication standard, and transmits the generated signal to the slave 33, thereby performing establishment of communication. The DUMMY-PHY 67A performs data transmission between the multiplex processing section 61 and the slave 33 after establishing communication with the slave 33. In such configuration, it is possible to appropriately perform transmission and reception of data between the multiplex processing section 61 and the slave 33 without requiring the PHYs 91, 92, and the cable 93 included in the mounting device 10A shown in FIG. 4. Since it is possible to reduce the number of the PHYs, a board mounting area is reduced and a device can be miniaturized. In transmission and reception of data between the multiplex processing section 61 and the slave 33, since the process of converting into an analog signal temporarily is omitted, it is possible to shorten the transmission time of the control data. Consequently, for example, in a case of circulating the EtherCAT frame in the industrial network, it is possible to shorten the transmission time required for the frame to make one circulation around the network and to increase the number of connectable slaves.

<Effect 2> The pseudo signal generation section 117 maintains the state of link down until the signal indicating the establishment of the multiplex communication is input from the multiplex state notification section 109 (S13 in FIG. 3: NO). When the signal indicating the establishment of the multiplex communication is input from the multiplex state notification section 109 (S13: YES), the pseudo signal generation section 117 responds with the register value indicating link up with respect to the slave 33. Here, if communication of the industrial network is started before the establishment of the multiplex communication, the control data cannot be transmitted between the master 23 and the slaves 33, 43 and an error occurs. In the mounting device 10 of this embodiment, since the communication of the industrial network is started after confirming the establishment of the multiplex communication, it is possible to prevent the occurrence of the above-mentioned situation.

<Effect 3> The DUMMY-PHY 67A generates a signal compliant with the MII communication standard used in Ethernet (registered trademark), which is a communication standard widely used in the industrial network. Accordingly, in such configuration, versatility is improved and it is possible to be employed in various industrial networks.

<Effect 4> In the slider section 13, the multiplex processing section 61, the slave 33, and the DUMMY-PHYs 67A, 67B are incorporated within the same logic circuit of the FPGA 60. Accordingly, board mounting area is reduced and a device can be miniaturized.

The present disclosure is not limited to the above-mentioned embodiment and it goes without saying that various improvements and modifications can be made without departing from the scope of the present disclosure.

For example, the communication standard employed in the industrial network is not limited to Ethernet (registered trademark) and may be other communication standards. The interface standard is not limited to the MII and may be a gigabit media independent interface (GMII) or a reduced media independent interface (RMII).

In the above-mentioned embodiment, the multiplex processing section 61, the slave 33, and the DUMMY-PHYs 67A, 67B are incorporated within the same FPGA 60, but these may be separately mounted.

In the above-mentioned embodiment, two slaves 33, 43 are connected to one master 23, but the number of masters may be equal to or more than 2, and the number of slaves may be equal to or more than 3.

In the above-mentioned embodiment, as the work machine in the present disclosure, the electronic component mounting device 10 for mounting the electronic component on the circuit board has been described. However, the work machine in the present disclosure is not limited to the electronic component mounting device and other board work machines such as a screen printing device can be employed as the work machine. For example, a work robot for performing assembly work of a secondary battery (for example, solar cell or fuel cell) or the like may be employed.

REFERENCE SIGNS LIST

10: electronic component mounting device, 15: head section, 23: master, 33, 43: slave, 61, 51, 71: multiplex processing section, 67A, 67B, 77: DUMMY-PHY, 117: pseudo signal generation section, 60: FPGA FIG. 1
51: MULTIPLEX PROCESSING SECTION (MASTER SIDE)
25: IMAGE PROCESSING SECTION
23: MASTER
61: MULTIPLEX PROCESSING SECTION (SLAVE SIDE)
33: SLAVE
35: RELAY
37: SENSOR
71: MULTIPLEX PROCESSING SECTION (SLAVE SIDE)
48: PARTS CAMERA
49: MARK CAMERA
43: SLAVE
45: RELAY
47: SENSOR FIG. 2
FOR EXAMPLE, RELAY OR SENSOR
33: SLAVE
113: MII INTERFACE
111: MII RECEPTION DATA PROCESSING SECTION
117: PSEUDO SIGNAL GENERATION SECTION
117A: REGISTER
115: MII TRANSMISSION DATA PROCESSING SECTION
LINK STATE OF MULTIPLEX COMMUNICATION
61: MULTIPLEX PROCESSING SECTION
103: DEMULTIPLEXING SECTION
101: MULTIPLEX RECEPTION PROCESSING SECTION
109: MULTIPLEX STATE NOTIFICATION SECTION
105: MULTIPLEXING SECTION
107: MULTIPLEX TRANSMISSION PROCESSING SECTION
FROM CONTROL SECTION
TO CONTROL SECTION
FIG. 3
MULTIPLEX COMMUNICATION START
S11: LINK DOWN PROCESS:
REGISTER VALUE→LINK DOWN
LINK LED→OFF
S13: MULTIPLEX COMMUNICATION ESTABLISHMENT?
S15: LINK UP PROCESS:
REGISTER VALUE→LINK UP
LINK LED→ON
S17: DATA TRANSMISSION PROCESS
S19: MULTIPLEX COMMUNICATION DISCONNECTION?
FIG. 4
51: MULTIPLEX PROCESSING SECTION (MASTER SIDE)
25: IMAGE PROCESSING SECTION
23: MASTER
61: MULTIPLEX PROCESSING SECTION (SLAVE SIDE)
33: SLAVE
35: RELAY
37: SENSOR
71: MULTIPLEX PROCESSING SECTION (SLAVE SIDE)
48: PARTS CAMERA
49: MARK CAMERA
43: SLAVE
45: RELAY
47: SENSOR

The invention claimed is:

1. A multiplex communication system comprising:
a processing circuit that processes control data in an industrial network;
a multiplex processing circuitry that multiplexes the control data input from the processing circuit and transmits multiplexed data to other processing circuits; and
a pseudo signal transmission circuitry, which is connected between the processing circuit and the multiplex processing circuitry, that transmits the control data between the multiplex processing circuitry and the processing circuit, by generating, in a pseudo manner, a signal compliant with a communication standard in the industrial network, transmitting the generated signal to the processing circuit, and establishing communication with the processing circuit,
wherein the pseudo signal transmission circuitry includes a MII interface that communicates with the processing circuitry, a MIT reception data processing section that communicates with a demultiplexing section of the multiplex processing circuitry, a MIT transmission data processing section that communicates with a multiplexing section of the multiplex processing circuitry, and a pseudo signal generation section that communicates with each of the MIT interface, the MIT reception data processing section, and the MIT transmission data processing section.

2. The multiplex communication system according to claim 1,
wherein the pseudo signal transmission circuitry starts an establishment process of communication with respect to the processing circuit according to an establishment of communication on a transmission line through which the multiplex processing circuitry transmits and receives the multiplexed data to and from other multiplex processing circuitry.

3. The multiplex communication system according to claim 1,
wherein a communication standard in the industrial network is Ethernet standard.

4. The multiplex communication system according to claim 1,
wherein the processing circuit is an IP core for configuring a programmable logic device circuit or an ASIC performing communication control.

5. The multiplex communication system according to claim 1,
wherein the multiplex processing circuitry, the pseudo signal transmission circuitry, and the processing circuit are circuits that are configured within a same programmable logic device.

6. A work machine that performs mounting work, comprising:
a movable section that holds a workpiece, and
the multiplex communication system according to claim 1 that performs transmitting data related to the mounting work.

* * * * *